3,307,792
TREATMENT OF PARTICULATE SOLIDS
William Hughes and Harold Edward Haigh, Norton, England, assignors to British Titan Products Company Limited, Durham, England, a corporation of the United Kingdom
Filed Oct. 23, 1963, Ser. No. 322,548
Claims priority, application Great Britain, Nov. 1, 1962, 41,387/62
10 Claims. (Cl. 241—98)

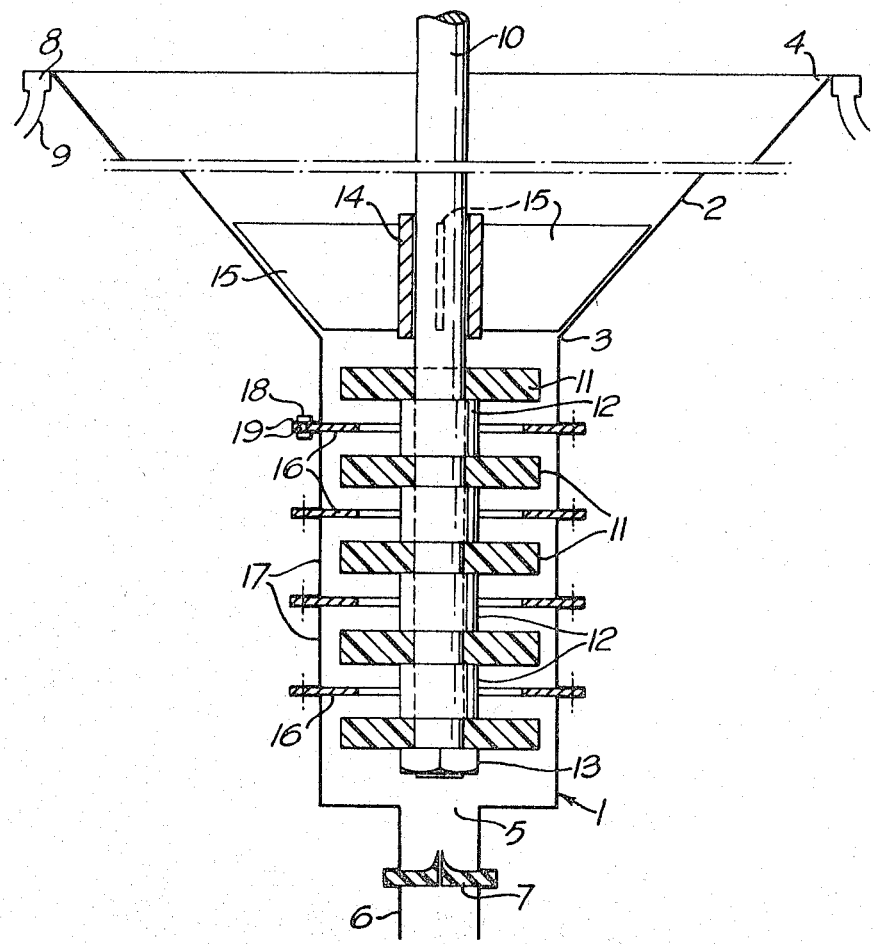

The present invention relates to an improved apparatus and process for the milling of particulate solids in liquids. The term "milling" is meant to include grinding of the solid to reduce particle size and dispersion of the solid in a liquid unaccompanied by a diminution in the size of the particles of the solid.

It is known practice to mill particulate solids, especially finely-divided solids, for example pigment particles, in liquids wherein these solids are agitated in the presence of a liquid and a particulate milling medium (which may act as a grinding medium). Such process is referred to hereinafter as "sand milling."

Sand milling has been used to reduce the particle size, to disperse solids in liquids, and, in the case of pigments, to improve the tinting strength. A case in which it may be used for all three purposes is that of titanium dioxide pigment, where the process may be used to reduce the size of the pigment particles, and/or to improve the tinting strength, and/or to disperse the pigment in a paint base.

One disadvantage of sand milling processes available hitherto is the excessive length of time during which the solids to be milled must be retained in the apparatus in order that sufficient grinding or dispersion of the solid should be obtained. This excessive retention time seriously limits the production rate through the sand mill.

It is an object of the present invention to provide an improved apparatus and process for sand milling in which the retention time in the mill required to obtain the desired result may be relatively short.

Accordingly, the present invention is an apparatus for sand milling comprising a container and a shaft rotatable within the container, the shaft carrying a plurality of impellers spaced apart along its length within the container, there being at least one baffle projecting inwardly from the interior wall of the container between the impellers so that the inner edge of the baffle and the outer edges of the impellers overlap, the baffle extending continuously or substantially continuously around the interior wall of the container.

The container is preferably a generally cylindrical vessel open at one end and having an orifice at the opposite end. In the preferred apparatus, the vessel is placed with its open end uppermost and the shaft projects downwardly from a drive mechanism through the open end or top of the container. The liquid and solid to be milled are then supplied usually as a slurry to the apparatus through the orifice at the lower end of the container and are withdrawn from the uppermost end of the container. Alternatively, the shaft may project upwardly through the lower closed end of the container, for example through a seal such as a mechanical seal.

A preferred type of container is one comprising a lower and an upper portion, the lower portion being the said cylinder having an open end on which is mounted the upper portion, the latter forming a continuation of the lower portion and having walls which slope outwardly to form a hollow inverted frusto-cone. A container of this type allows the particulate milling medium (for example particles of silica, zircon, alumina, titanium dioxide, glass or ceramic material or beads) which are present in the chamber during the sand milling to settle preferentially and return to the lower portion of the container as the milled solid/liquid slurry rises in the upper portion of the container. In containers of this type the liquid and milled solid may be withdrawn as a slurry from the top of the upper portion and, as noted above, the particulate milling medium selectively settles and returns to the lower portion of the container to be utilised in the milling of more pigment.

If desired the upper portion of the container may be a cylindrical extension of the lower portion of the container of similar diameter.

Another form of container which may be used is one having an inlet orifice at one end and at the opposite end an exit port provided with a wire mesh or other sieve device for selectively retaining milling medium within the container while allowing the liquid and milled solid to pass out of the container. When this form of container is used, the pigment and liquid medium (e.g. water), either separately or as a slurry, may if desired be fed to the top of the container and discharged after grinding through the bottom of the container where the sieve will retain the grinding medium.

If desired, a grinding apparatus in which the feed is introduced into the top of the container may be used in series with a grinding apparatus in which the feed is introduced into the bottom of the container.

The shaft carrying the impellers is conveniently a cylindrical shaft adapted to be driven by means of an electric motor.

The impellers, which are normally rigidly fixed to the shaft and rotate therewith, may be solid or hollow discs of diameter smaller than the internal diameter of the container in which they operate, or they may be spoked annular impellers. They may carry projections on their upper and/or lower surfaces, if desired. They may conveniently be from about 0.1 of an inch to about 6 inches, preferably from 1 inch to 3 inches, in thicknes.

The diameter of the impeller is suitably such that a space of about 0.1 of an inch to about 6 inches preferably at least about 1 inch, exists between the interior wall of the container and the periphery of the impellers. It is preferred that there are at least two impellers on the shaft within the container but any number may be used, for example up to 12. A convenient spacing of the impellers along the shaft is one in which the distance between adjacent impellers is from 1 to 10 inches, although the distance may be greater or less if desired.

It is preferred to position the baffles so that one baffle projects between each pair of adjacent impellers. This can be achieved by forming the container of successive sections and by bolting or otherwise clamping annular discs between the sections in such a manner that the inner edge of each annular disc projects between the impellers. In the case of larger machines, however, it has been found convenient to provide a container composed of vertical sections bolted or otherwise fixed together. By the use of such a container in which baffles are welded or otherwise fixed between sections, the assembly of the apparatus is made easier since the vertical sections of the contained need merely be placed in position and fixed so that the baffles project between the impellers which are already assembled on the shaft.

The width of the baffle projecting into the container should be greater than the distance between the periphery of the impeller and the interior wall of the container, thus ensuring that the inner edge of the baffle projects inwardly beyond the periphery of the impeller into the space between the upper and lower surfaces of adjacent impellers. It has been found convenient to provide baffles which project inwardly from the interior wall of the container for a distance up to about twice that between the periphery of the impeller and the interior wall of the container, but the distance may be greater than this if desired.

The thickness of the baffles should of course be such that a gap is left between the upper and lower surfaces of adjacent impellers and the lower and upper surfaces of the baffle between these impellers to allow the slurry in the container to pass freely between the baffles and the rotating impellers into the space between adjacent impellers.

It has been found convenient to form the baffles of such a cross section that the sharp corners between the upper and lower surfaces of the baffles and the interior wall of the container are eliminated and replaced by a smooth curve. Baffles of this cross section prevent the accumulation of pigment or solid grinding medium in the corners between the baffles and the container wall.

The inner edge of the baffles may, if desired, be serrated or castellated. The serrations or castellations may be formed other than in the plane of the respective baffle, so as to affect the direction of flow of the material passing the edge of the baffle.

The impellers and baffles should normally be made of material resistant to the abrasive action of the particulate solids in the container. The impellers may be coated with, or composed of, polyurethane rubber and, if desired, the baffles may also be coated with or composed of this material. Polyurethane rubber is resistant to abrasion and does not tend to cause discolouration of the milled solids. The latter quality is particularly useful when the milled solid is a pigment as it is very desirable to avoid the discolouration of pigment.

By the use of apparatus according to the present invention it has been found that the efficiency of sand milling is increased and the retention time required to achieve a given result is much reduced. Thus it has been found that a substantial increase in tinting strength in the grinding of titanium dioxide pigment in water or other liquid media, or satisfactory dispersion of solid in a liquid, is obtained in a much shorter time than that needed in the absence of the baffle or baffles of this invention. The invention therefore increases substantially the amount of solid which can be milled in a given time in an apparatus of given dimensions, for example in some cases the throughput of the pigment being milled may be doubled.

One reason for the increased efficiency is believed to be that in the absence of the baffles of the invention a substantial proportion of the solid to be milled passes through the container between the interior wall and the periphery of the impellers without passing into the space between the upper and lower surfaces of adjacent impellers where the full milling action is exerted. For this increased efficiency to be obtained, it is essential that there be overlapping between the inner edge of the baffles and the outer edge of the impellers. Consequently, in the absence of the baffles of the invention it is necessary to retain the solid to be milled in the apparatus for a sufficient length of time to ensure that solid which escapes the action of the impellers initially is recirculated around the container until it is subjected to the milling action of the impellers.

In addition there is an increase in the proportion of static surface in relation to the moving surfaces (i.e. the impellers and shaft) in the container when baffles according to the present invention are present which provides additional retardation of the swirling motion of the contents in the container and thus increases the efficiency of grinding.

The solid milling medium may comprise particles of silica, zircon, alumina, titanium dioxide or glass or ceramic material. The particle size of this milling medium may vary according to whether grinding or dispersion of the milled solid is to be effected, but an average particle size in the range of about 76 microns to 3,000 microns, preferably 250 microns to 2,500 microns and particularly 400 to 600 microns, is generally suitable.

A method of using the apparatus of the present invention will now be described.

A charge of milling medium is introduced into the container and the impellers are rotated at high speed, for example at a speed in the range of 2,000 ft./min. to 4,000 ft./min. measured at the periphery of the impeller. The solid to be milled and a liquid are then continuously supplied to the container, preferably through an inlet port in the base of the container fitted with a flexible non-return slit valve, for example of the Perreaux type. The solid and liquid rise in the container over the baffle or baffles and are consequently directed between the upper and lower surfaces of adjacent impellers where the solid is subjected, in the presence of milling medium, to the milling action induced by the rotating impellers. When the pigment/liquid slurry containing milling medium reaches the upper part of the container, either the milling medium may be selectively retained by a sieve which allows the milled solid/liquid slurry to pass through, or the mixture may be passed into a settling zone, for example an upper portion of the container of the inverted frusto-cone type or cylindrical extension of the lower part of the container previously described, in which the milling medium preferentially settles out and returns to the lower part of the container. If desired water or other liquid may be added to the upper part of the container to dilute the slurry present there and thus assist in the selective settling out of the grinding medium.

Best results may be obtained when the lower part of the container, where the milling takes place, is filled with grinding medium before operation of the process has begun. Preferably the apparatus is filled, before operation, with grinding medium extending a little way up the frusto-conical upper part of the container, when such a frusto-conical upper part is to be used. The operation of the impellers may cause some lifting of the mass of grinding medium.

If the solid is a pigment to be dispersed in a liquid, the liquid of the slurry is the liquid in which the pigment is to be dispersed, for example a paint base.

The invention is illustrated by the accompanying drawing which shows in vertical section a preferred milling apparatus.

The container of the apparatus is formed by a cylindrical lower portion 1 and an inverted frusto-conical upper portion 2 forming a continuation of the lower portion 1. The lower portion 1 is 10 inches in diameter and 24 inches in height. The upper portion 2 is therefore also 10 inches in diameter at its lower and 3 and is 48 inches in diameter at its upper end 4. Its height is 16 inches.

The container is open at the top 4; at the bottom is an orifice 5 connected to an inlet pipe 6 fitted with a rubber non-return slit valve 7 of the Perreaux type. Around the top 4 of the container is an overflow channel 8 having a lead-off pipe 9.

A shaft 10 projects downwardly along the vertical axis of the lower and upper portions 1 and 2. The shaft 10 has concentrically mounted thereon five impeller discs 11 rotatable with the shaft. These are 8 inches in diameter and three-quarters of an inch thick. The impeller discs 11 are supported 4 inches apart by means of distance pieces 12 and the bottom impeller disc 11 is supported by a nut 13. Part of the shaft 10 in the upper portion 2 is surrounded by a loose collar 14 carrying four vertical vanes 15. The vanes are not rotated by the shaft but serve to minimise or prevent vortex formation in the upper portion 2.

A baffle in the form of an annular disc 16 projects inwardly from the wall of the lower section 1 between each pair of adjacent impeller discs 11. Each annular disc 16 is mounted between a pair of cylindrical sections 17 forming the lower portion 1 and is held in place by bolts 18 passing through the annular disc and through outwardly projecting elements 19 of the cylindrical sections 17. Each annular disc 16 is three-sixteenths of an inch thick (when made as in this case from mild steel) and projects inwardly for 2 inches from the wall of the lower portion 1. (The thickness of the annular discs may be greater, particularly if these are made from other material, for example polyurethane.)

In the operation of the apparatus, a charge of grinding medium such as sand or glass beads is placed in the lower portion of the container 1 and the shaft 10 is rotated at about 1400 r.p.m. A slurry of the solid to be milled, for example an aqueous slurry of titanium dioxide pigment, is then introduced through the inlet orifice 5. As the slurry rises up the sloping sides of the upper portion of the container 2 the grinding medium preferentially settles out and returns to the lower portion of the container 1. The remaining solid/liquid slurry rises over the edge of the upper portion of the container 4 and collects in the overflow channel 8 from which it is led off through pipes 9. If desired, additional water can be supplied to the upper portion of the container 2 to assist in the preferential settling out of the grinding medium.

The non-return valve 7 allows the slurry to pass through the inlet orifice 5 into the lower portion 1, but should the supply of slurry decrease or fail then the non-return valve 7 closes and prevents the backflow of slurry containing milling medium from the inlet orifice 5 into the inlet pipe 6.

EXAMPLE 1

The apparatus used was similar to that previously described. A charge of 200 lbs. of soda glass particles having a particle size in the range 0.4 to 0.6 mm. was placed in the lower portion of the container 1 and the impellers 11 were rotated at 1400 r.p.m.

An aqueous titanium dioxide slurry having a concentration of 600 grams per litre was fed to the inlet orifice 5 at a rate of 0.08 cubic metre per hour, giving an average residence time in the lower portion of the container of 9 mins. The material recovered from the lead-off pipes 9 had a tinting strength (estimated on the Reynold's Scale) of 1790.

To provide a contrast to the above example, the baffles 16 were then removed from the device and an aqueous titanium dioxide slurry containing the same pigment at the same concentration as in the example was fed to the inlet orifice 5. It was found that a feeding rate of 0.045 cubic metre per hour was necessary to give a tinting strength of the material recovered from the lead-off pipes 9 of only 1730. This feeding rate meant that the retention time was 16 minutes instead of the 9 minutes of the example. If the feeding rate was made as high as in the example (0.08 cubic metre per hour, i.e. a retention time of 9 minutes), the tinting strength of the material recovered fell to only 1675.

EXAMPLE 2

The apparatus used was similar to that previously described, but had the following dimensions:

Internal diameter of lower portion 1 _____inches__ 21½
Height of lower portion 1 _____do____ 48
Diameter of impellers 11 _____do____ 17½
Number of impellers 11 _____ 6
Distance apart of impellers 11 _____inches___ 7

The apparatus was provided in turn with sets of baffles 16 which projected inwardly for various distances from the internal wall of the lower portion 1 of the container midway between the impellers 11. The distances which the baffles projected from the internal wall were 2" (as far as the periphery of the impeller); 2½" (½" overlap); 3" (1" overlap); 3½" (1½" overlap) and 5" (3" overlap).

The apparatus was operated with each of the sets of baffles, the impellers being rotated at 625 r.p.m.

The apparatus contained for each operation a charge of 1400 pounds of Ottawa sand as grinding medium and was fed from a common feed-stock of aqueous TiO₂ slurry containing 650 grams/litre $TiO_2$ and sodium silicate (1.5% as $SiO_2$ on $TiO_2$) as a dispersing agent at a rate of 0.32 cubic metre per hour in each case.

Samples of the pigment were taken when equilibrium had been established and these were examined for tinting strength by the Reynolds Blue method. The power consumption of the mill was noted.

The following results were obtained:

| Overlap: | Tinting strength |
|---|---|
| (1) 0 | 1710 |
| (2) ½" | 1760 |
| (3) 1" | 1760 |
| (4) 1½" | 1760 |
| (5) 3" | 1760 |

In (1) above (which is not according to the present invention) the tinting strength is lower than in (2) to (5) which are according to the present invention.

What is claimed is:
1. An apparatus for sand milling comprising:
    (a) a generally vertical container;
    (b) means for feeding particulate solids and liquid into the bottom of said container;
    (c) means for removing milled solids and liquid from the upper portion of said container;
    (d) a rotatable shaft extending axially into said container;
    (e) a plurality of impellers spaced along said shaft and attached thereto so as to be rotatable therewith; and
    (f) at least one fixed baffle extending substantially continuously around the inner wall of said container and projecting inwardly from said interior wall between a pair of adjacent impellers, overlapping the respective edges of said impellers, said baffle adapted to deflect upwardly flowing fluid impinging thereon in the general direction of said rotatable shaft and between said adjacent impellers.
2. The apparatus of claim 1 in which said vertical container is cylindrical and in which said impellers are discs of a diameter smaller than the internal diameter of said container.
3. The apparatus of claim 1 in which there are a plurality of baffles.
4. The apparatus of claim 1 in which at least one fixed baffle projects inwardly from the interior wall of said container between a pair of adjacent impellers, overlapping the respective edges of said impellers for a distance that is up to twice the distance between the periphery of said impellers and said interior wall.
5. The apparatus of claim 2 in which the diameter of said impellers is such that a space of at least 1 inch exists between the interior wall of said container and the outer edges of said impellers.
6. The apparatus of claim 2 in which the diameter of said impellers is such that a space of from 0.1 to 6 inches exists between the interior wall of said container and the outer edges of said impellers.
7. An apparatus for sand milling comprising:
    (a) a generally vertical container having an upper and lower portion;
        (1) said lower portion being generally cylindrical;
        (2) said upper portion comprising a continuation of said lower portion and having walls sloping outward to form a hollow inverted frusto-cone;
    (b) means for feeding particulate solids and liquid into the bottom of said lower portion of said container;
    (c) means for removing milled solids and liquid from said upper portion of said container;
    (d) a rotatable shaft extending axially into said lower portion of said container;
    (e) a plurality of impellers spaced along said shaft and attached thereto so as to be rotatable therewith;

(f) at least one fixed baffle extending substantially continuously around the inner wall of said lower portion of said container and projecting inwardly from said interior wall between a pair of adjacent impellers, overlapping the respective edges of said impellers, said baffle adapted to deflect upwardly flowing fluid impinging thereon in the general direction of said rotatable shaft and between said adjacent impellers.

8. The apparatus of claim 7 in which said impellers are discs of a diameter smaller than the internal diameter of said lower portion of said container.

9. The apparatus of claim 7 in which there are a plurality of baffles.

10. The apparatus of claim 7 in which at least one fixed baffle projects inwardly from the interior wall of said lower portion of said container between a pair of adjacent impellers, overlapping the respective edges of said impellers for a distance that is up to twice the distance between the periphery of said impellers and said interior wall.

References Cited by the Examiner
UNITED STATES PATENTS

| | | | |
|---|---|---|---|
| 241,653 | 5/1881 | Harrison | 241—153 X |
| 2,019,454 | 10/1935 | Larsen | 241—153 X |
| 2,581,414 | 1/1952 | Hochberg | 241—22 |
| 2,592,994 | 4/1952 | Ahlmann | 241—153 X |
| 3,050,263 | 8/1962 | Barkman | 241—172 X |
| 3,149,789 | 9/1964 | Szegvari | 241—172 X |
| 3,172,609 | 3/1965 | Olsen | 241—172 X |
| 3,185,398 | 5/1965 | Hughes | 241—171 X |
| 3,223,336 | 12/1965 | Wienert | 241—153 X |

WILLIAM W. DYER, JR., *Primary Examiner.*

H. F. PEPPER, JR., *Assistant Examiner.*